United States Patent
Kamble et al.

(10) Patent No.: US 10,255,435 B1
(45) Date of Patent: Apr. 9, 2019

(54) SYSTEMS AND METHODS FOR ESTABLISHING A REPUTATION FOR RELATED PROGRAM FILES

(71) Applicant: Symantec Corporation, Mountain View, CA (US)

(72) Inventors: Vishal Kamble, Pune (IN); Himanshu Dubey, Gwailior (IN); Tausif Kazi, Pune (IN)

(73) Assignee: Symantec Corporation, Mountain View, CA (US)

( * ) Notice: Subject to any disclaimer, the term of this patent is extended or adjusted under 35 U.S.C. 154(b) by 113 days.

(21) Appl. No.: 15/047,130

(22) Filed: Feb. 18, 2016

(51) Int. Cl.
*G06F 21/56* (2013.01)
*H04L 29/06* (2006.01)
*G06F 21/57* (2013.01)
*G06F 21/50* (2013.01)

(52) U.S. Cl.
CPC .......... *G06F 21/56* (2013.01); *H04L 63/145* (2013.01); *G06F 21/50* (2013.01); *G06F 21/562* (2013.01); *G06F 21/564* (2013.01); *G06F 21/565* (2013.01); *G06F 21/57* (2013.01)

(58) Field of Classification Search
CPC ........ G06F 21/56; G06F 21/50; G06F 21/562; G06F 21/564; G06F 21/565; G06F 21/57
See application file for complete search history.

(56) References Cited

U.S. PATENT DOCUMENTS

| | | | | |
|---|---|---|---|---|
| 8,499,350 | B1* | 7/2013 | Satish ................... | G06F 21/566 726/23 |
| 9,367,686 | B1* | 6/2016 | Solodovnikov ....... | G06F 21/561 |
| 2012/0090025 | A1* | 4/2012 | Milner .................... | G06F 21/51 726/22 |
| 2013/0145471 | A1* | 6/2013 | Richard ................ | G06F 21/564 726/24 |
| 2015/0172303 | A1* | 6/2015 | Humble .............. | H04L 63/1408 726/23 |
| 2016/0232358 | A1* | 8/2016 | Grieco .................. | G06F 21/577 |

OTHER PUBLICATIONS

"Symantec Insight", http://www.symantec.com/reputation-based-security/, as accessed Dec. 19, 2015, Symantec Corporation, (Jan. 24, 2012).
Wallace, Brian, "Using .NET GUIDs to help hunt for malware", https://www.virusbulletin.com/virusbulletin/2015/06/using-net-guids-help-hunt-malware, as accessed Dec. 19, 2015, Virus Bulletin, (Jun. 25, 2015).

\* cited by examiner

*Primary Examiner* — Ayoub Alata
(74) *Attorney, Agent, or Firm* — FisherBroyles, LLP

(57) ABSTRACT

The disclosed computer-implemented method for establishing a reputation for related program files may include (1) identifying a set of related program files, where each program file includes one or more common metadata field values and the values of the metadata fields are set by a program development tool, (2) identifying one or more of the set of related program files as malicious, (3) determining that a proportion of malicious files in the set of related program files is above a threshold, and (4) in response to determining that the proportion of malicious files is above the threshold, associating a negative reputation with the metadata field values. Various other methods, systems, and computer-readable media are also disclosed.

20 Claims, 6 Drawing Sheets

SYSTEMS AND METHODS FOR ESTABLISHING A REPUTATION FOR RELATED PROGRAM FILES

BACKGROUND

In recent years, authors of malicious software ("malware") have attempted to proliferate malware by generating thousands or potentially millions of related variants of malicious files. For example, a malware developer may create many unique variants of a malware executable, each based on a common design. Alternatively, the malware program may modify itself each time it propagates to a new computer system, or even every time it runs (so-called "polymorphic malware").

Unfortunately, many existing anti-malware technologies identify malware by detecting or identifying unique digital signatures or fingerprints associated with files determined to be malicious. Applying this approach to a malware program with many unique variants may entail separately identifying each malware variant. In the case of polymorphic malware, identifying one variant of a malware program may not yield a digital signature or fingerprint that can be used to identify another variant. Additionally, once many variants of a single malware program have been identified, additional analysis may be required to determine that the variants are based on a common design. Accordingly, the instant disclosure identifies and addresses a need for additional and improved systems and methods for establishing a reputation for related program files.

SUMMARY

As will be described in greater detail below, the instant disclosure describes various systems and methods for establishing a reputation for related program files by identifying metadata fields in a set of program files indicating that the program files were developed from a common code base. If a significant proportion of the related program files are determined to be malicious, systems and methods described herein may associate a negative reputation with the related files.

In one example, a computer-implemented method for establishing a reputation for related program files may include (1) identifying a set of related program files, where each program file includes one or more common metadata field values and the values of the metadata fields are set by a program development tool, (2) identifying one or more of the set of related program files as malicious, (3) determining that a proportion of malicious files in the set of related program files is above a threshold, and (4) in response to determining that the proportion of malicious files is above the threshold, associating a negative reputation with the metadata field values.

In one embodiment, the computer-implemented method may further include identifying an additional program file that includes the common metadata field value and in response to identifying the additional program file that includes the common metadata field value, determining that the program file has the negative reputation. In some examples, identifying the set of related program files may include receiving, from a client agent, one or more program files with the metadata field value. In one embodiment, the common metadata field identifies a program module version.

In one embodiment, the program development tool may include an assembler, a compiler, a linker, a program loader, a build tool, a revision control tool, and/or an integrated development environment. In some examples, identifying the program file as malicious may include identifying potentially malicious behavior initiated by the program file and/or identifying, within the program file, a signature previously associated with malware. In some examples, associating the negative reputation with the metadata field value may include associating the negative reputation with a hash value of each program file in the set of related program files. In some examples, associating the negative reputation with the metadata field value may include identifying the metadata field value to a reputation service as having the negative reputation.

In one embodiment, a system for implementing the above-described method may include several modules stored in memory, such as (1) a file identification module that identifies a set of related program files, where each program file includes one or more common metadata field values and the values of the metadata fields are set by a program development tool, (2) a malware module that identifies one or more of the set of related program files as malicious, (3) an analysis module that determines that a proportion of malicious files in the set of related program files is above a threshold, and (4) a reputation module that, in response to determining that the proportion of malicious files is above the threshold, associates a negative reputation with the metadata field values. The system may also include at least one physical processor configured to execute the file identification module, the malware module, the analysis module, and the reputation module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify a set of related program files, where each program file includes one or more common metadata field values and the values of the metadata fields are set by a program development tool, (2) identify one or more of the set of related program files as malicious, (3) determine that a proportion of malicious files in the set of related program files is above a threshold, and (4) in response to determining that the proportion of malicious files is above the threshold, associate a negative reputation with the metadata field value.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
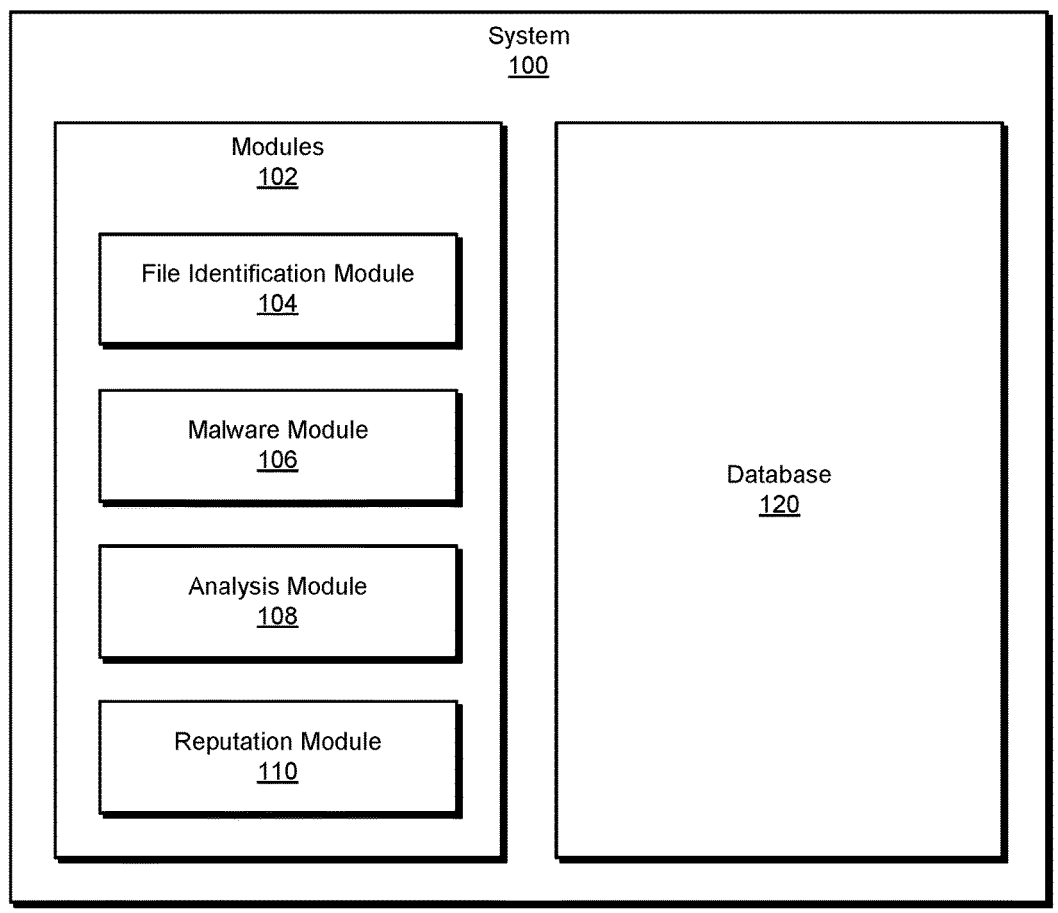
FIG. 1 is a block diagram of an exemplary system for establishing a reputation for related program files.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for establishing a reputation for related program files. As will be explained in greater detail below, the systems and methods described herein may establish a reputation for a related set of program files by identifying program files with a common metadata field value that has been set by a program development tool, then determining the proportion of malware files in the program file set. If the proportion of malware files set is above a threshold, the systems and methods described herein may associate a negative reputation with files in the program file set.

Figure 2:
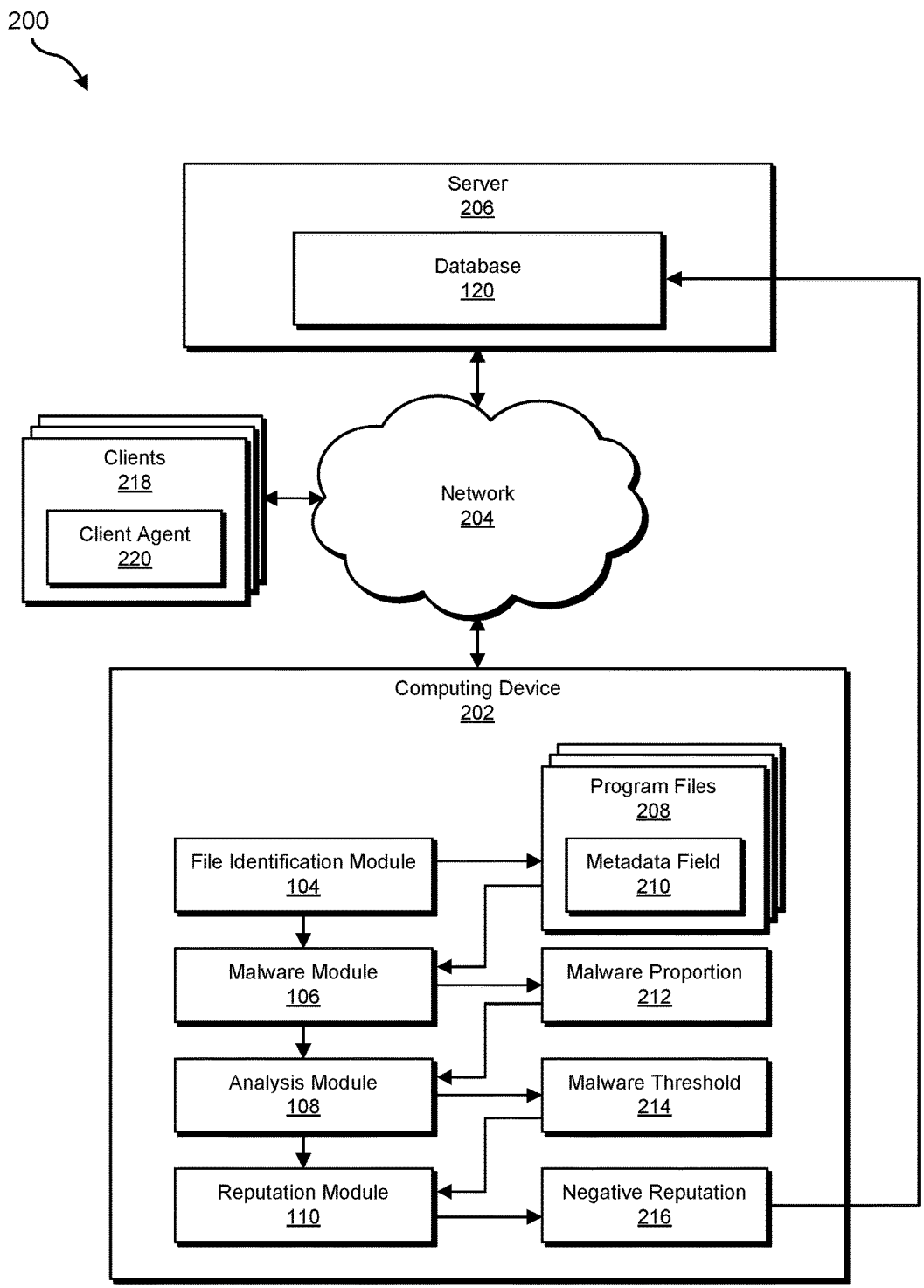
FIG. 2 is a block diagram of an additional exemplary system for establishing a reputation for related program files.
Figure 3:
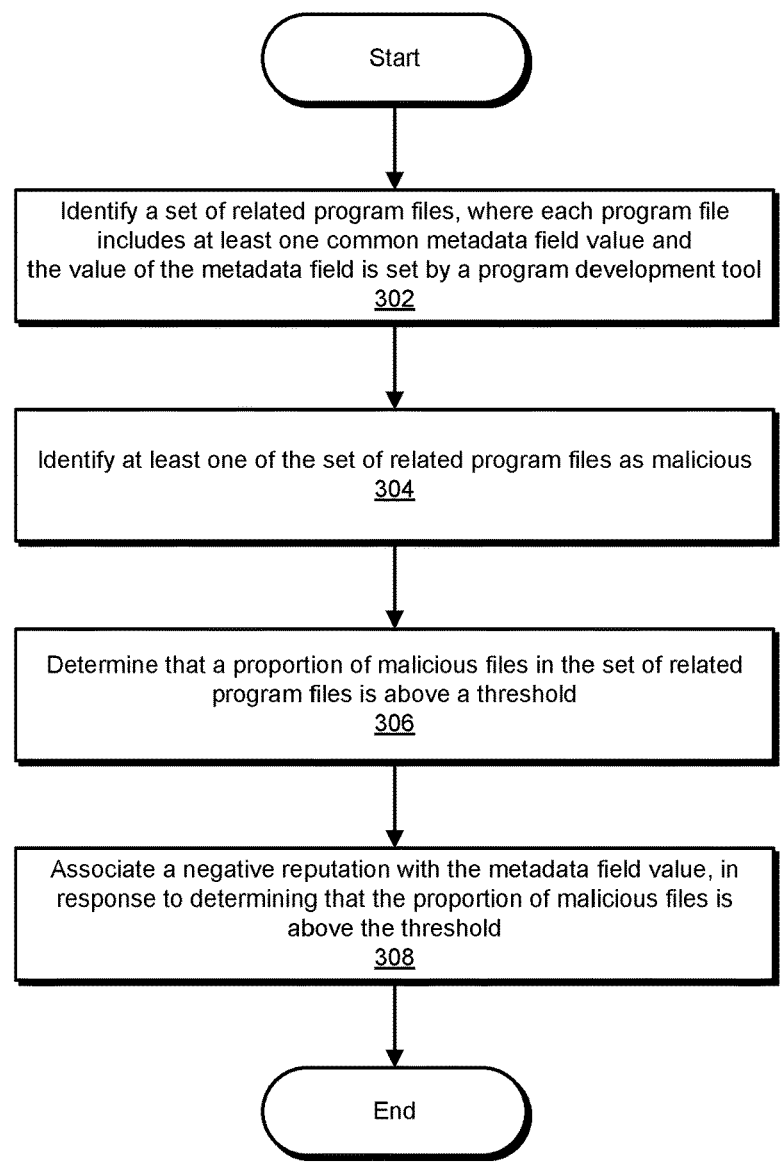
FIG. 3 is a flow diagram of an exemplary method for establishing a reputation for related program files.
Figure 4:
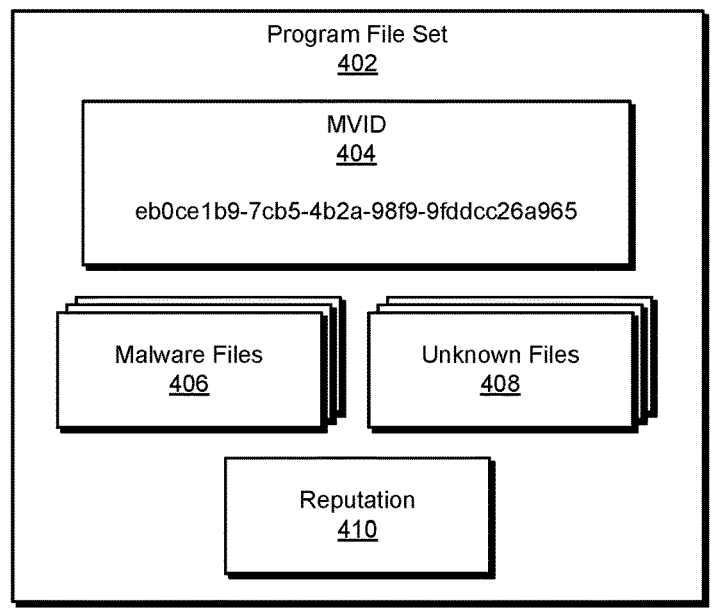
FIG. 4 is a block diagram of exemplary program file data.
Figure 4:
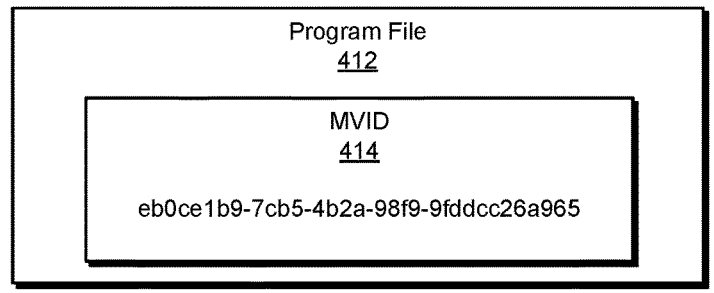

The following will provide, with reference to FIGS. 1, 2, and 4 detailed descriptions of exemplary systems for establishing a reputation for related program files. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of exemplary system 100 for establishing a reputation for related program files. As illustrated in this figure, exemplary system 100 may include one or more modules 102 for performing one or more tasks. For example, and as will be explained in greater detail below, exemplary system 100 may include a file identification module 104 that identifies a set of related program files, where each program file includes one or more common metadata field values and the values of the metadata fields are set by a program development tool. Exemplary system 100 may additionally include a malware module 106 that identifies one or more of the set of related program files as malicious. Exemplary system 100 may also include an analysis module 108 that determines that a proportion of malicious files in the set of related program files is above a threshold. Exemplary system 100 may additionally include a reputation module 110 that, in response to determining that the proportion of malicious files is above the threshold, associates a negative reputation with the metadata field value. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store data that indicates the trustworthiness of various objects or entities, such as software programs or software publishers. Reputation data may be quantified as a reputation score that may be calculated on the basis of several factors, such as the prevalence of a software program, the reputation of the software program's publisher or developer, a community rating, and/or an evaluation by a trusted entity.

Database 120 may represent portions of a single database or computing device or a plurality of databases or computing devices. For example, database 120 may represent a portion of server 206 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as server 206 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, enable computing device 202 and/or server 206 to establish a reputation for related program files. For example, and as will be described in greater detail below, one or more of modules 102 may cause computing device 202 and/or server 206 to establish a reputation for related program files. For example, and as will be described in greater detail below, file identification module 104 may identify one or more related program files 208, where each program file includes one or more common metadata field values 210 and the values of the metadata fields are set by a program development tool. Malware module 106 may identify at least one of program files 208 as malicious. Analysis module 108 may determine that a malware proportion 212 of malicious files in related program files 208 is above a malware threshold 214. Reputation module 110 may, in response to determining that malware proportion 212 of program files 208 is above malware threshold 214, associate negative reputation 216 with metadata field value 210.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 510 in FIG. 5, or any other suitable computing device.

Server 206 generally represents any type or form of computing device that is capable of receiving, comparing, and storing data. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between computing device 202 and server 206.

FIG. 3 is a flow diagram of an exemplary computer-implemented method 300 for establishing a reputation for related program files. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302, one or more of the systems described herein may identify a set of related program files, where each program file includes one or more common metadata field values 210 and the values of the metadata fields are set by a program development tool. For example, file identification module 104 may, as part of computing device 202 in FIG. 2, identify a set of related program files 208, where each program file includes one or more common metadata field values 210 that were set by a program development tool.

The term "program development tool," as used herein, generally refers to computer programs that software developers use to create, debug, maintain, or otherwise support other programs. Program development tools may include assemblers, compilers, linkers, program loaders, build tools, revision control tools, and/or integrated development environments.

File identification module 104 may identify a set of related program files in a variety of ways. For example, file identification module 104 may identify program files 208 stored on one or more servers or cloud storage services with common metadata field values 210 indicating that the program files 208 may have been developed from a common code base. Program files may include executable program files, library files, or any other file that contains digital code that executes as part of a program. In one embodiment, the common metadata field identifies a program module version. For example, the MICROSOFT .NET development platform uses a globally unique identifier called the module version ID (MVID) as a version number for compiled modules. Variants of a program may be identified by a common MVID.

In some examples, file identification module 104 may identify the set of related program files 208 by receiving, from a client agent, at least one program file with the metadata field value. For example, file identification module 104 may, as part of computing device 202 in FIG. 2, identify a set of related program files 208 by receiving program files 208 from one or more client agents 220 running on clients 218. In one example, one or more of client agents 220 may identify several program files 208 with a common metadata field 210, indicating that the program files 208 may be related by being developed from a common code base. In another example, one or more of client agents 220 may provide one or more program files 208 to file identification module 104, which then determines that several program files 208 received from one or more of client agents 220 running on one or more clients 218 have a common metadata field 210, and therefore may be related by being developed from a common code base.

In some examples, file identification module 104 may identify the set of related program files 208 by receiving information about program files from one or more services that store, analyze, or otherwise manage files. For example, identification module 104 may receive information about suspicious or malicious program files from a computer security service. Identification module 104 may also receive information about program files from data loss prevention services, data archive services, cloud storage services, file servers, and/or application servers. As will be described in greater detail below, by receiving information about program files from a variety of sources, systems and methods described herein may determine that the proportion of a set of related program files that are malicious is sufficient to associate a negative reputation with the metadata field value that identifies the set of related program files.

At step 304, one or more of the systems described herein may identify at least one of the set of related program files as malicious. For example, malware module 106 may, as part of computing device 202 in FIG. 2, identify at least one of related program files 208 as malicious.

Malware module 106 may identify one of the related program files as malicious in a variety of ways. For example, malware module 106 may identify a program file as malicious by identifying potentially malicious behavior initiated by the program file and/or identifying, within the program file, a signature previously associated with malware. In another example, at least one of client agents 220 running on one of clients 218 may identify a program file as malicious based on observed malicious behavior or by identifying a digital signature within the program file as being associated with malware. Client agent 220 may then identify the program file as malicious to malware module 106. In another example, a cloud-based computer security service or a security service running on a server such as server 206 may identify a program file as malicious to malware module 106.

At step 306, one or more of the systems described herein may determine that a proportion of malicious files in the set of related program files is above a threshold. For example, analysis module 108 may, as part of computing device 202 in FIG. 2, determine that malware proportion 212 of malicious files in related program files 208 is above malware threshold 214.

A set of related files may include files identified as malicious, suspicious, safe, or with an unknown reputation. Analysis module 108 may determine that the proportion of malicious files in a set of related files is above a threshold in a variety of ways. For example, analysis module 108 may base the reputation of the set of related program files on the number of program files identified as malicious as compared to the number of program files identified as safe, or to the number of program files identified as malicious as compared to the total number of related program files. As mentioned in connection with step 302 above, file identification module 104 may receive information about program files from a variety of sources, including computer security services, data loss prevention services, data archive services, cloud storage services, file servers, and/or application servers. Because a computer security service may report only on program files identified as malicious, analysis module 108 may base its analysis of the proportion of program files identified as malicious at least in part on the source of the program file information. For example, analysis module 108 may determine that when a specific number of related program files (for example, more than one) has been identified as malicious by a computer security service, that the entire set of related program files should be assigned a negative reputation.

At step 308, one or more of the systems described herein may, in response to determining that the proportion of malicious files is above the threshold, associate a negative reputation with the metadata field value. For example, reputation module 110 may, as part of computing device 202 in FIG. 2, in response to determining that malware proportion 212 of malicious files in program files 208 is above malware threshold 214, associate negative reputation 216 with metadata field value 210.

Reputation module 110 may associate a negative reputation with the metadata field value in a variety of ways. For example, reputation module 110 may associate the negative reputation with the metadata field value by identifying the metadata field value to a reputation service as having the negative reputation. In another example, for a reputation service that identifies program files only by hash value, reputation module 110 may associate the negative reputation with the metadata field value by associating the negative reputation with a hash value of each program file in the set of related program files. In this situation, reputation module 110 may maintain a database of metadata field values and associated reputations, such that program files identified with a previously encountered metadata field value may be associated with the corresponding reputation previously assigned.

In one embodiment, systems and methods described herein may include identifying an additional program file that includes the common metadata field value and in response to identifying the additional program file that includes the common metadata field value, determining that the program file has the negative reputation. For example, file identification module 104 may, as part of computing device 202 in FIG. 2, identify an additional program file that includes metadata field value 210 common to program files 208. Reputation module 110 may determine that because the additional program file includes the metadata field value 210 associated with program files 208, that the additional program file has negative reputation 216 previously associated with program files 208.

FIG. 4 is a block diagram of exemplary program file data 400 for which systems and methods described herein may establish a reputation. As shown in FIG. 4, exemplary program file data 400 may include a program file set 402 of related program files with a common metadata field value, MVID 404, which has the value "eb0ce1b9-7cb5-4b2a-98f9-9fddcc26a965." Program file set 402 may include several files identified as malware files 406 and unknown files 408 with an unknown reputation. File identification module 104, as part of system 200 in FIG. 2, may have identified program file set 402 as a set of related program files with a common metadata field value that was set by a program development tool. Malware module 106 may have identified malware files 406 as files with a malicious or suspicious reputation. Analysis module 108 may calculate a malware proportion 212 of malware files 406 compared to the total number of files in program file set 402. Analysis module 108 may then determine that malware proportion 212 for program file set 402 is above malware threshold 214 and that program file set 402 should be assigned a negative reputation. Based upon the determination that program file set 402 includes a malware proportion 212 of malware files 406 above malware threshold 214, reputation module 110 may assign a negative reputation 410 to program file set 402.

Exemplary program file data 400 in FIG. 4 may also include an additional program file 412 not initially included in program file set 402. File identification module 104, as part of system 200 in FIG. 2, may determine, based on MVID 414 in program file 412 having the same value as MVID 404 in program file set 402, that program file 412 should be included in program file set 402 and be assigned reputation 410 previously assigned to program file set 402.

As described in greater detail above, the systems and methods described herein may establish a reputation for a related set of program files by first identifying a set of program files with a common metadata field value that was set by a program development tool. After identifying the set of related program files, the systems and methods described herein may calculate the proportion of program files in the program file set that have been identified as malicious. If the calculated proportion is above a threshold, the systems and methods described herein may associate a negative reputation with the metadata field value. The systems and methods described herein may also report the metadata field value to a reputation service as having a negative reputation, so that the reputation service may associate the negative reputation with any additional program files subsequently identified with the common metadata field value.

Figure 5:
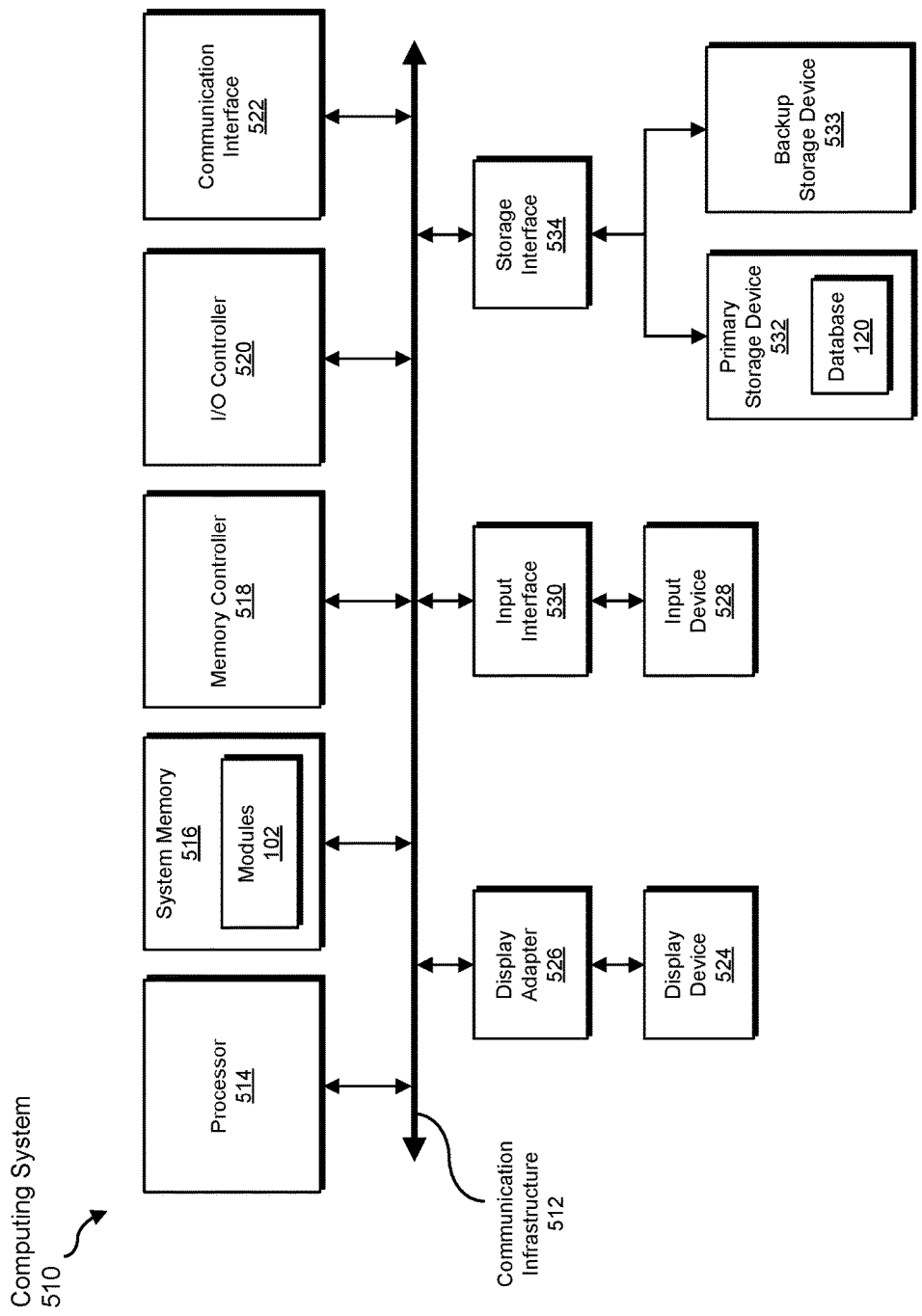
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations.

For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
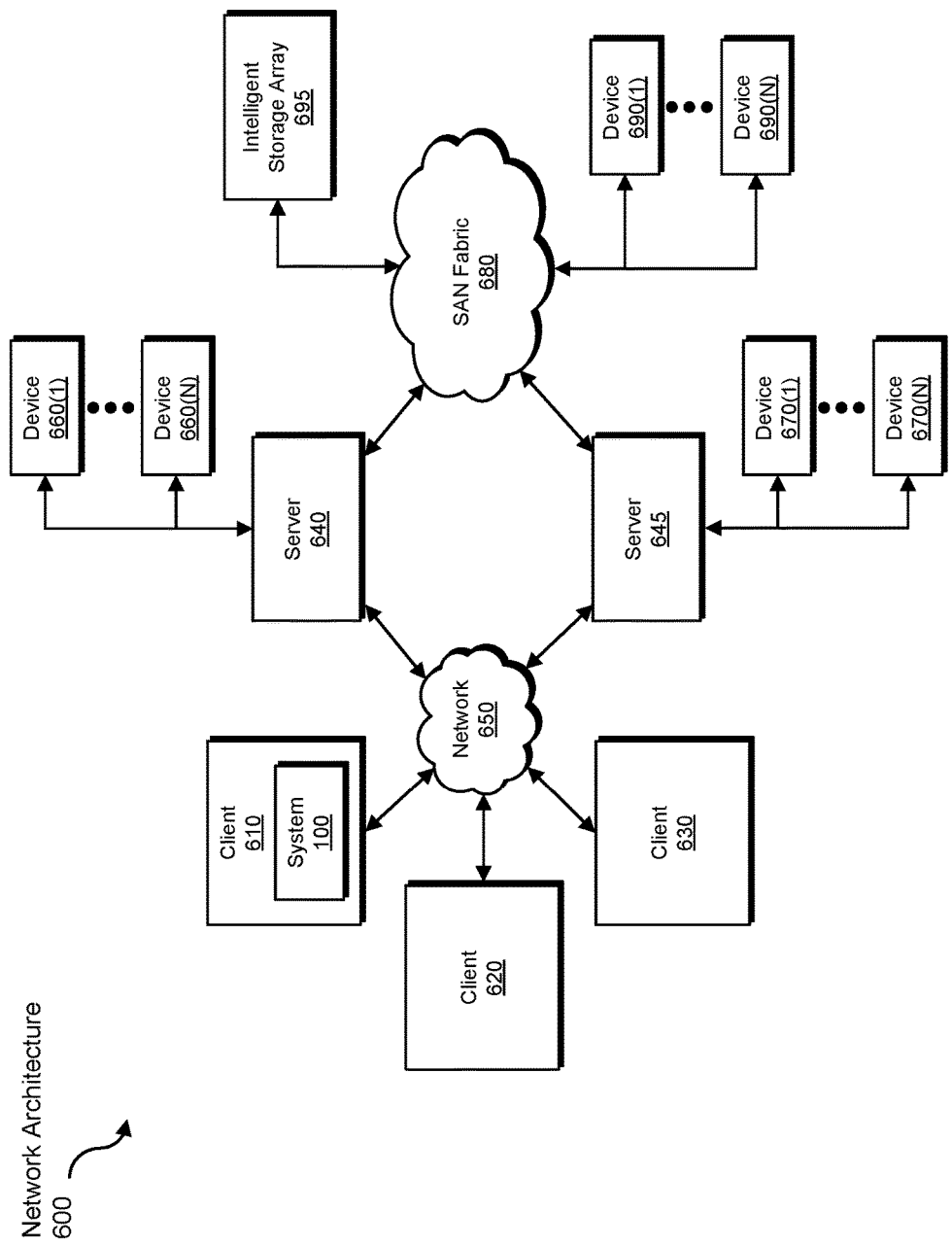
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for establishing a reputation for related program files.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a set of related program files to be transformed, transform the related program files, output a result of the transformation to identify one or more malicious program files, use the result of the transformation to determine a proportion of malicious files in the set of related program files, and store the result of the transformation to associate a reputation with the set of related program files. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for establishing a reputation for related program files, at least a portion of the method being performed by a computing device comprising at least one processor, the method comprising:
    identifying a set of related program files, wherein:
        each program file includes at least one common metadata field value that comprises a globally unique program module version identifier that is common to multiple variants of a malware program file, the at least one common metadata field value comprising a module version ID according to the MICROSOFT. NET development platform; and
        the value of the metadata field is set by a program development tool;
    identifying at least one of the set of related program files as malicious;
    determining that a proportion of malicious files in the set of related program files is above a threshold; and
    in response to determining that the proportion of malicious files is above the threshold, associating a negative reputation with the globally unique program module version identifier that is common to the multiple variants of the malware program file;
    wherein the method is performed by an anti-malware program to protect a user from malware.

2. The computer-implemented method of claim 1, further comprising:
    identifying an additional program file that includes the at least one common metadata field value; and
    in response to identifying the additional program file that includes the at least one common metadata field value, determining that the program file has the negative reputation.

3. The computer-implemented method of claim 1, wherein identifying the set of related program files comprises receiving, from a client agent, at least one program file with the metadata field value.

4. The computer-implemented method of claim 1, wherein the program development tool comprises an assembler.

5. The computer-implemented method of claim 1, wherein the program development tool comprises at least one of:
    a compiler;
    a linker;
    a program loader;
    a build tool;
    a revision control tool; and
    an integrated development environment.

6. The computer-implemented method of claim 1, wherein identifying the program file as malicious comprises at least one of:
    identifying potentially malicious behavior initiated by the program file; and
    identifying, within the program file, a signature previously associated with malware.

7. The computer-implemented method of claim 1, wherein associating the negative reputation with the metadata field value comprises associating the negative reputation with a hash value of each program file in the set of related program files.

8. The computer-implemented method of claim 1, wherein associating the negative reputation with the metadata field value comprises identifying the metadata field value to a reputation service as having the negative reputation.

9. A system for establishing a reputation for related program files, the system comprising:
    a file identification module, stored in memory, that identifies a set of related program files, wherein:
        each program file includes at least one common metadata field value that comprises a globally unique program module version identifier that is common to multiple variants of a malware program file, the at least one common metadata field value comprising a module version ID according to the MICROSOFT. NET development platform; and
        the value of the metadata field is set by a program development tool;
    a malware module, stored in memory, that identifies at least one of the set of related program files as malicious;
    an analysis module, stored in memory, that determines that a proportion of malicious files in the set of related program files is above a threshold;
    a reputation module, stored in memory, that, in response to determining that the proportion of malicious files is above the threshold, associates a negative reputation with the globally unique program module version identifier that is common to the multiple variants of the malware program file; and
    at least one physical processor configured to execute the file identification module, the malware module, the analysis module, and the reputation module as part of an anti-malware program to protect a user from malware.

10. The system of claim 9, wherein:
    the file identification module identifies an additional program file that includes the at least one common metadata field value; and
    the reputation module, in response to identifying the additional program file that includes the at least one common metadata field value, determines that the program file has the negative reputation.

11. The system of claim 9, wherein the file identification module identifies the set of related program files by receiving, from a client agent, at least one program file with the metadata field value.

12. The system of claim 9, wherein the program development tool comprises an assembler.

13. The system of claim 9, wherein the program development tool comprises at least one of:
   a compiler;
   a linker;
   a program loader;
   a build tool;
   a revision control tool; and
   an integrated development environment.

14. The system of claim 9, wherein the file identification module identifies the program file as malicious by at least one of:
   identifying potentially malicious behavior initiated by the program file; and
   identifying, within the program file, a signature previously associated with malware.

15. The system of claim 9, wherein the reputation module associates the negative reputation with the metadata field value by associating the negative reputation with a hash value of each program file in the set of related program files.

16. The system of claim 9, wherein the reputation module associates the negative reputation with the metadata field value by identifying the metadata field value to a reputation service as having the negative reputation.

17. A non-transitory computer-readable medium comprising one or more computer-readable instructions that, when executed by at least one processor of a computing device, cause the computing device to:
   identify a set of related program files, wherein:
      each program file includes at least one common metadata field value that comprises a globally unique program module version identifier that is common to multiple variants of a malware program file, the at least one common metadata field value comprising a module version ID according to the MICROSOFT.NET development platform; and
      the value of the metadata field is set by a program development tool;
   identify at least one of the set of related program files as malicious;
   determine that a proportion of malicious files in the set of related program files is above a threshold; and
   in response to determining that the proportion of malicious files is above the threshold, associate a negative reputation with the globally unique program module version identifier that is common to the multiple variants of the malware program file;
   wherein the computer-readable instructions form at least part of an anti-malware program that, when executed, protects a user from malware.

18. The non-transitory computer-readable medium of claim 17, wherein the one or more computer-readable instructions cause the computing device to:
   identify an additional program file that includes the at least one common metadata field value; and
   in response to identifying the additional program file that includes the at least one common metadata field value, determine that the program file has the negative reputation.

19. The non-transitory computer-readable medium of claim 17, wherein the one or more computer-readable instructions cause the computing device to identify the set of related program files by receiving, from a client agent, at least one program file with the metadata field value.

20. The non-transitory computer-readable medium of claim 17, wherein the program development tool comprises an assembler.

* * * * *